(12) United States Patent
Cole et al.

(10) Patent No.: US 7,680,833 B1
(45) Date of Patent: Mar. 16, 2010

(54) SYSTEM AND METHOD FOR DATABASE STRUCTURE COMPARISON

(75) Inventors: Stephen Ray Cole, Elgin, TX (US); Christopher Michael Johnson, Austin, TX (US); Jeffrey David Omo, Austin, TX (US)

(73) Assignee: BMC Software, Inc., Houston, TX (US)

( * ) Notice: Subject to any disclaimer, the term of this patent is extended or adjusted under 35 U.S.C. 154(b) by 930 days.

(21) Appl. No.: 10/302,165

(22) Filed: Nov. 22, 2002

(51) Int. Cl.
*G06F 12/00* (2006.01)
*G06F 17/30* (2006.01)

(52) U.S. Cl. .............. 707/201; 707/2; 707/3; 707/7; 707/10; 707/101; 707/102; 707/205

(58) Field of Classification Search .......... 707/3, 707/10, 6, 5, 102, 104.1, 100, 101, 103 R, 707/1; 701/208; 705/1; 379/221.09; 706/12; 711/154
See application file for complete search history.

(56) References Cited

U.S. PATENT DOCUMENTS

| | | | | |
|---|---|---|---|---|
| 4,924,510 A * | 5/1990 | Le | .......... | 379/221.09 |
| 5,297,280 A * | 3/1994 | Potts et al. | .......... | 707/5 |
| 5,765,172 A * | 6/1998 | Fox | .......... | 707/204 |
| 5,897,627 A * | 4/1999 | Leivian et al. | .......... | 706/12 |
| 5,898,836 A * | 4/1999 | Freivald et al. | .......... | 709/218 |
| 5,956,705 A * | 9/1999 | Stevens et al. | .......... | 707/2 |
| 5,974,574 A * | 10/1999 | Lennie et al. | .......... | 714/52 |
| 6,041,303 A * | 3/2000 | Mathews | .......... | 705/1 |
| 6,161,107 A * | 12/2000 | Stern | .......... | 707/104.1 |
| 6,278,992 B1 * | 8/2001 | Curtis et al. | .......... | 707/3 |
| 6,279,007 B1 * | 8/2001 | Uppala | .......... | 707/101 |
| 6,295,541 B1 * | 9/2001 | Bodnar et al. | .......... | 707/203 |
| 6,334,129 B1 * | 12/2001 | Kiyoki et al. | .......... | 707/5 |
| 6,374,252 B1 * | 4/2002 | Althoff et al. | .......... | 707/102 |
| 6,446,235 B1 * | 9/2002 | Drottar et al. | .......... | 714/781 |
| 6,553,388 B1 * | 4/2003 | Perks | .......... | 707/201 |
| 6,557,004 B1 * | 4/2003 | Ben-Shachar et al. | .......... | 707/102 |
| 6,578,031 B1 * | 6/2003 | Washizawa | .......... | 707/6 |
| 6,581,074 B1 * | 6/2003 | Wong et al. | .......... | 707/201 |
| 6,618,727 B1 * | 9/2003 | Wheeler et al. | .......... | 707/10 |
| 6,636,802 B1 * | 10/2003 | Nakano et al. | .......... | 701/208 |
| 6,839,714 B2 * | 1/2005 | Wheeler et al. | .......... | 707/102 |
| 6,848,078 B1 * | 1/2005 | Birsan et al. | .......... | 715/206 |
| 7,062,493 B1 * | 6/2006 | Babka et al. | .......... | 707/100 |
| 7,096,421 B2 * | 8/2006 | Lou | .......... | 715/234 |
| 7,231,525 B1 * | 6/2007 | Beuque | .......... | 713/181 |
| 7,324,514 B1 * | 1/2008 | Haq et al. | .......... | 370/392 |

(Continued)

*Primary Examiner*—Hosain T Alam
*Assistant Examiner*—Isaac M Woo
(74) *Attorney, Agent, or Firm*—Sprinkle IP Law Group

(57) ABSTRACT

Systems and methods for comparing one database structure to another to identify differences between the two. In one embodiment, tree structures corresponding to each database are generated. The tree structures have nodes corresponding to objects in the databases. Each node has an individual check value based on the node attributes and a cumulative check value based on the attributes of the node and its sub-nodes. Beginning with the uppermost nodes of each tree, the check values are compared to identify differences in the check values, hence the node/tree attributes. If the cumulative check values match, the sub-nodes match and do not need to be compared directly. Only the portions of the tree structures that do not have matching check values are traversed. If individual check values do not match, the attributes of the corresponding nodes are compared to determine the exact differences.

18 Claims, 3 Drawing Sheets

U.S. PATENT DOCUMENTS

| | | | |
|---|---|---|---|
| 7,437,664 | B2 * | 10/2008 | Borson ........................ 715/234 |
| 2002/0059465 | A1 * | 5/2002 | Kim ............................ 709/248 |
| 2002/0184504 | A1 * | 12/2002 | Hughes ........................ 713/177 |
| 2002/0194484 | A1 * | 12/2002 | Bolosky et al. ............. 713/189 |
| 2003/0037020 | A1 * | 2/2003 | Novak et al. .................... 707/1 |
| 2003/0084031 | A1 * | 5/2003 | Tarquini ........................ 707/3 |
| 2003/0177119 | A1 * | 9/2003 | Cole ............................. 707/7 |
| 2003/0237047 | A1 * | 12/2003 | Borson ........................ 715/513 |
| 2004/0098544 | A1 * | 5/2004 | Gaither et al. ............... 711/154 |
| 2005/0091261 | A1 * | 4/2005 | Wu et al. ..................... 707/102 |

* cited by examiner

SYSTEM AND METHOD FOR DATABASE STRUCTURE COMPARISON

FIELD OF THE INVENTION

The invention relates generally to the field of computer systems and more particularly to the field of database administration.

DESCRIPTION OF RELATED ART

It is sometimes necessary to compare the structure of one database to another. For instance, if a database is being developed, it may be necessary to compare different versions of the database in order to track the changes that have been made to it. As another example, a store may have a master database at its headquarters, as well as multiple local copies of the database at individual store locations which may need to be periodically checked to ensure that they match the master database.

When it is necessary to compare two databases, it is often desirable to compare large portions, or even the entire structures of the databases. Conventionally, this is done by retrieving a portion of the objects in the two databases and performing a straightforward, one-to-one comparison of each object from the first database to the corresponding object in the other database. In other words, the name of one object is compared to the name of the other object, then the types of the two objects are compared, and so on, to determine if the two objects are identical. This same process is carried out for each object in the two databases.

There are a number of problems with the conventional methods for comparing databases. One of the most noticeable is that the one-to-one comparison process is increasingly time consuming. In the past, databases typically did not have large numbers of objects in their structures. Current databases, however, include increasing numbers of objects and require increasing amounts of time for one-to-one comparisons. It is not unusual now to have a database that includes 40,000 to 50,000 objects, for example. Conventional methodologies may require from 8 hours (for the BMC Change Manager product) to more than 3 days (for the Oracle Enterprise Manager product) to complete a comparison of such a database.

Another problem that exists with conventional methodologies is that the database objects are typically requested individually or in small groups. This may be due, in part, to an effort on the part of the user (a database administrator) to minimize the number of objects that have to be compared. When this information is retrieved in repeated requests, the overhead associated with the requests is substantial. In fact, in the case of a large database, it only takes about 20 individual requests before the overhead becomes greater than the overhead to make a single request for all of the objects in the database.

Another problem with conventional methodologies is that the number of object comparisons cannot be reduced without some prior knowledge of the potential differences between the databases being compared. As noted above, a comparison of the entire database structure can take days to complete. The number of direct comparisons between objects can be reduced by comparing only selected portions of the databases, but this requires that the database administrator know which portions of the database structure do and do not need to be compared. If a changed portion of the structure is omitted from the comparison, the differences will go unnoticed.

Another problem that may arise in the use of conventional methodologies is that similar portions of two databases may not be compared when they probably should be compared. For example, if the name of a table in one database has been changed, but the remainder of the table's characteristics remain the same, conventional comparison algorithms may interpret the tables as being completely different. If the table is first compared to a very dissimilar table in the other database, it may not even be considered for comparison to the similar, but differently named table. This may be another situation in which a database administrator is required to have prior knowledge of differences in order to be able to control or correctly interpret the results of the comparison.

Another problem with conventional methodologies is that they are not easily scalable. Consider the example of the store for which the master database is compared to the local copies of the database at individual store locations. If there are 100 store locations and each comparison takes only eight hours, the entire process requires 800 hours of computer time. There is no economy of scale, and none of the work performed in the comparison of the master database to one of the local databases can be re-used in the comparison of the master to another database.

SUMMARY OF THE INVENTION

One or more of the problems outlined above may be solved by the various embodiments of the invention. Broadly speaking, the invention comprises systems and methods for comparing one database structure to another to identify differences between the two. One embodiment of the invention comprises a method, wherein tree structures representative of each database structure have check values associated with each of their nodes, wherein the check values correspond to the database objects represented by the nodes. Because the check values will be the same for identical structures, the database structures can be compared by comparing their respective check values.

In one embodiment, tree structures are generated by pulling all of the object data for a database at once. The data is pulled from the database catalog, starting with the higher-level objects, such as users, and then working downward. Once the tree structure has been generated, 64-bit CRC values are calculated for each of the nodes in the tree. One value (the individual CRC) is based on the characteristics of only the associated node. Another (the cumulative CRC) is based on the characteristics of the sub-nodes below the associated node. This is repeated for a second database. The tree structures are compared from top to bottom, checking individual CRC values, and then the cumulative values. If the individual CRC at a given node in the tree for a first database matches the check value of the corresponding node in the tree of the second database, then it is known that the node matches the corresponding node in the other database. If the cumulative CRCs of the two nodes match, then it is known that the sub-nodes below them are identical in both databases, and there is no need to compare any of the sub-nodes in that branch of the tree. If the individual CRC values do not match, then the characteristics of the nodes are compared, one-to-one to identify the exact difference. If the cumulative CRC values do not match, then the sub-nodes are each examined in the same manner as the parent node to identify any differences between the two databases.

Another embodiment of the invention comprises a software application. The software application is embodied in a computer-readable medium such as a floppy disk, CD-ROM, DVD-ROM, RAM, ROM, or the like. The computer readable medium contains instructions which are configured to cause a computer to execute a method which is generally as described above. It should be noted that the computer readable medium may comprise a RAM or other memory which forms part of a computer system. The computer system would thereby be enabled to perform a method in accordance with the present disclosure and is believed to be within the scope of the appended claims.

Numerous additional embodiments are also possible.

BRIEF DESCRIPTION OF THE DRAWINGS

Other objects and advantages of the invention may become apparent upon reading the following detailed description and upon reference to the accompanying drawings.

Figure 1:
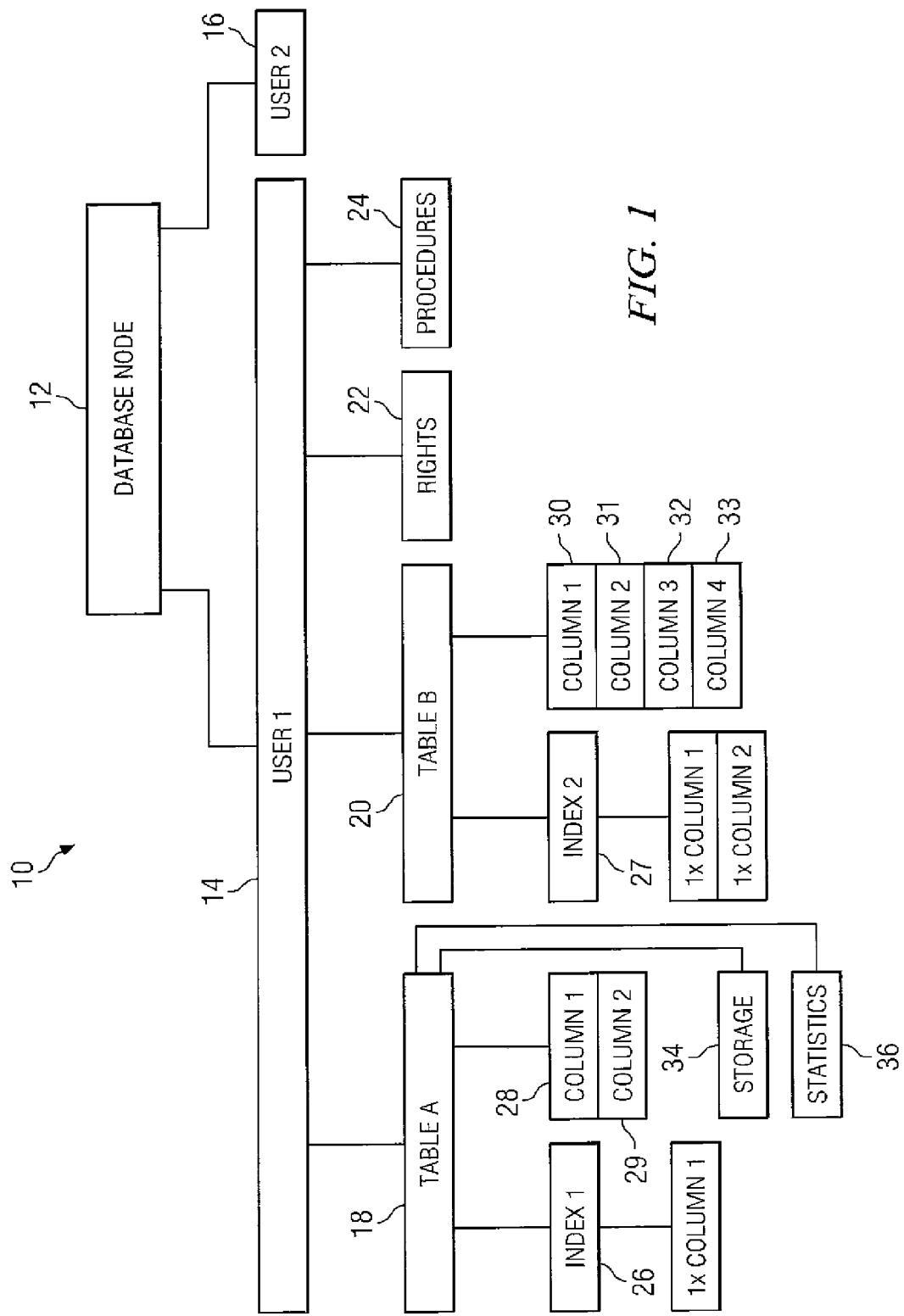
FIG. 1 is a diagram illustrating the structure of a very simple database.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DETAILED DESCRIPTION OF A PREFERRED EMBODIMENT

A preferred embodiment of the invention is described below. It should be noted that this and any other embodiments described below are exemplary and are intended to be illustrative of the invention rather than limiting.

Broadly speaking, the invention comprises systems and methods for comparing one database structure to another to identify differences between the two. One embodiment of the invention comprises a method, wherein a tree structure representative of the database structure has a CRC (cyclical redundancy check) value associated with each of its nodes, wherein the CRC corresponds to the database object represented by the node. In this embodiment, each node has both an individual CRC value based on the name and attributes of the node itself and a cumulative CRC value based on the characteristics (e.g., names and attributes) of the objects below the node on the tree. Because the CRCs will be the same for identical structures, the database structures can be compared by comparing their respective CRCs. The tree structures are therefore compared from top to bottom. If the cumulative CRC at a given node in the tree for a first database matches the cumulative CRC of the corresponding node in the tree of the second database, then it is known that the nodes, and all of the tree structures below the nodes, match. There is therefore no need to make a one-to-one comparison of the underlying structure. This method therefore obviates the need to compare every object in each database to ensure that each of the objects is matched. This method also enables the user to quickly and easily trace the differences between the tree structures without any prior knowledge.

It should be noted that the methods and systems disclosed herein are directed to the comparison of tree structures that are representative of the structures of corresponding databases. Accordingly, references herein to the comparison of databases or database objects in the present systems and methods are understood to be comparisons through the tree structures or nodes that are representative of the databases or objects. It should also be noted that, for the sake of simplicity, the nodes of the tree structures which have no underlying sub-nodes and which are commonly referred to as leaves will simply be referred to herein as nodes.

As mentioned above, it is often desirable to be able to determine whether there are any differences between the structures of a first database and a second database. The various embodiments of the present invention facilitate this process, and may provide advantages over conventional methodologies in terms of speed, scalability, ability to identify specific differences, etc.

As used herein, "structure" refers to the organizational structure of the database, and not to the data stored according to this structure. Referring to FIG. 1, a diagram illustrating the structure of a very simple database is shown. The structure of the database is shown in the form of a tree structure 10. Tree structure 10 is made up of nodes representing the different objects that form the structure of the database. These objects may comprise such things as users, tables, indices, columns, or any other such object. At the top of tree 10 is a first node 12 representing the database itself. Below database node 12 are two user nodes 14, 16. Below user node 14 are two table nodes 18, 20, as well as nodes for rights 22 and procedures 24. Below table nodes 18 and 22 are index nodes 26-27 column nodes 28-33, storage node 34 and statistics node 36.

It should be noted that the diagram of FIG. 1 is intended merely to illustrate the representation of the objects within a database in the form of a tree structure, and should not be considered limiting of the types of objects within the database, the complexity of the structure, etc.

Figure 2:
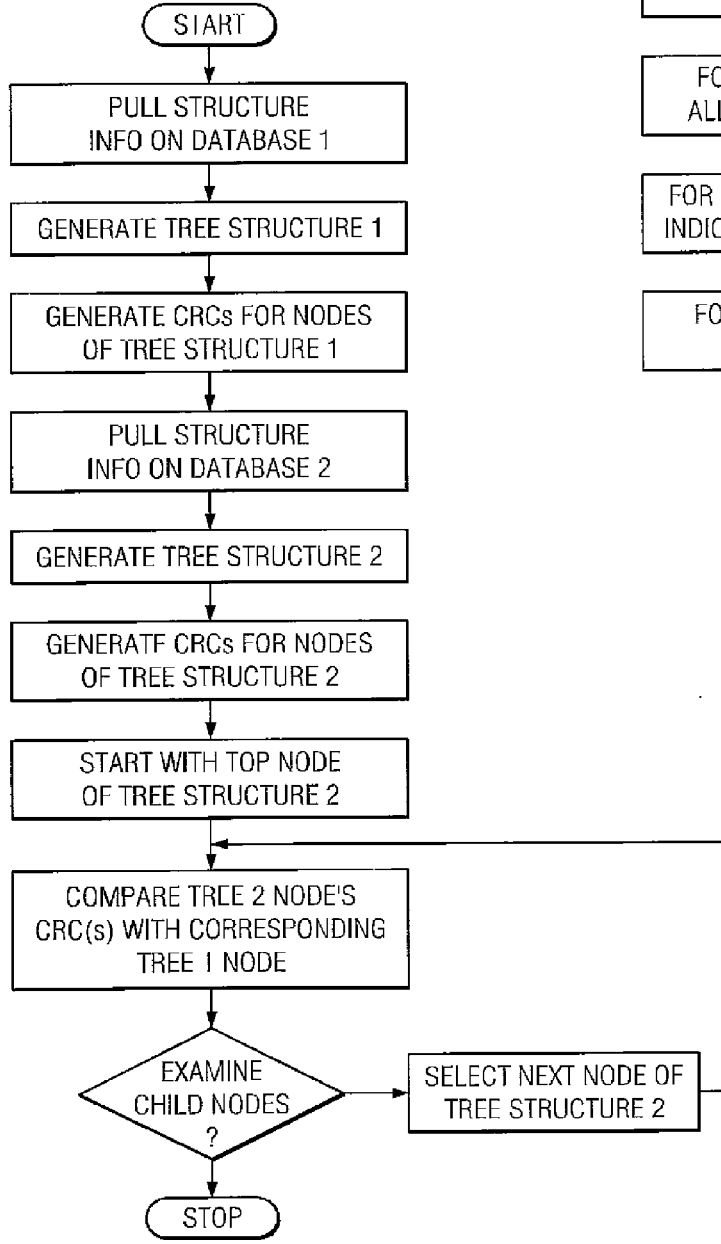
FIG. 2 is a flow diagram illustrating a method in accordance with one embodiment of the invention.

Referring to FIG. 2, a flow diagram illustrating a method in accordance with one embodiment of the invention is shown. As depicted in this figure, the first step in the method is to pull all the structure data for a first database, 110. In other words, the names and attributes of all of the objects in the database are retrieved. The objects (and corresponding attributes) are selected in parent-child order and a tree structure corresponding to the database is generated, 120, with the database as the top node in the structure.

Figure 3:
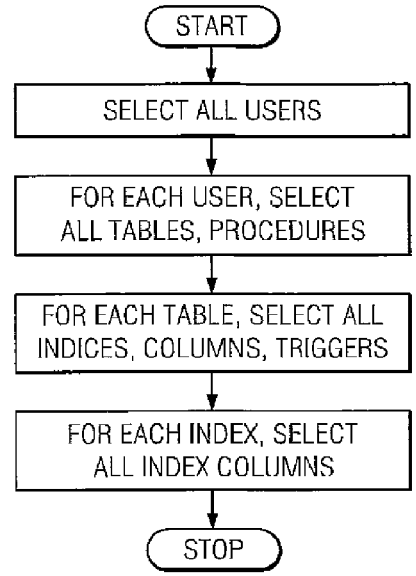
FIG. 3 is a flow diagram illustrating the selection of the database object information in one embodiment.

Referring to FIG. 3, a flow diagram illustrating the selection of the database object information in one embodiment is shown. As noted above, the information is retrieved at the same time in order to reduce the associated overhead. The information is selected from the top of the object hierarchy to the bottom to facilitate generation of the tree structure. This may also be referred to as parent-child order. Thus, the users are selected first, 111 (the database already occupies the uppermost node of the tree). Then, the objects directly under the users, such as each user's tables and procedures, are selected, 112. Then, the objects under the tables, procedures, etc. are selected, 113, and so on, 114. Again, it should be noted that the types of objects referred to in the example of FIG. 3 are merely illustrative and should not be considered to limit the types of objects that may be included in the database and the resulting tree structure.

Referring again to FIG. 2, after the tree structure has been generated, CRC values are calculated for and associated with each of the objects, 130. In one embodiment, both individual CRC values (corresponding only to the associated object) and cumulative or summary CRC values (corresponding to the associated object and all of the objects below it in the tree structure) are calculated. The CRC values are calculated on the basis of the same name and attribute information that is used as the basis for comparison in conventional methodologies. In the case of the individual CRC values, this information includes only the name and attributes of the object with which the CRC value is associated. In the case of the cumulative CRC values, this information includes the names and attributes of this object as well as all of the sub-objects below it in the tree structure.

The CRC values are calculated by taking the name and attribute information for the object(s) and calculating the CRC for the resulting bitstream. Because the computation of CRC values is well-known in the computational arts, these computation methodologies will not be discussed in detail here. It should be noted that, although the preferred embodiment utilizes a 64-bit CRC, other embodiments do not have to employ this particular value. It is possible to use other types of CRCs (e.g., 32-bit or 128-bit) or other mechanisms, such as checksums or the like to generate values representative of the objects and sub-objects.

After the tree structure corresponding to the first database has been generated and CRC values have been calculated and associated with the nodes of the tree structure, this part of the process is repeated for the second database, 140, 150, 160. Thus, there are two tree structures: one corresponding to the first database; and the other corresponding to the second database.

The next step is to begin comparing the CRC values of the first tree structure with those of the second tree structure. In one embodiment, the comparison of CRC values begins with the uppermost node in the tree structure (i.e., the database node), 170. The CRC of this node in the first tree structure is compared with the CRC of that corresponding node in the second tree structure, 180. If the CRCs indicate that the node and the structure below it in the tree are identical to the corresponding structure in the other database, then there is no need to examine any of the underlying structure (the child nodes) (see 190). If the comparison of the CRCs indicates that there are differences in the child nodes, these nodes are selected to be examined in the same manner (i.e., have their CRCs compared to corresponding nodes in the tree for the other database) (see 200).

Figure 4:
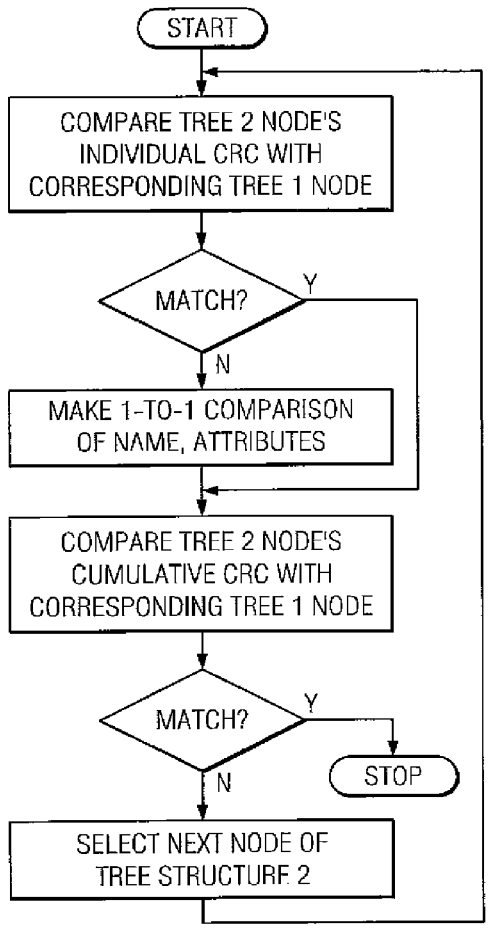
FIG. 4 is a flow diagram illustrating a first approach for the comparison of the individual and cumulative CRCs of two tree structures in one embodiment.
Figure 5:
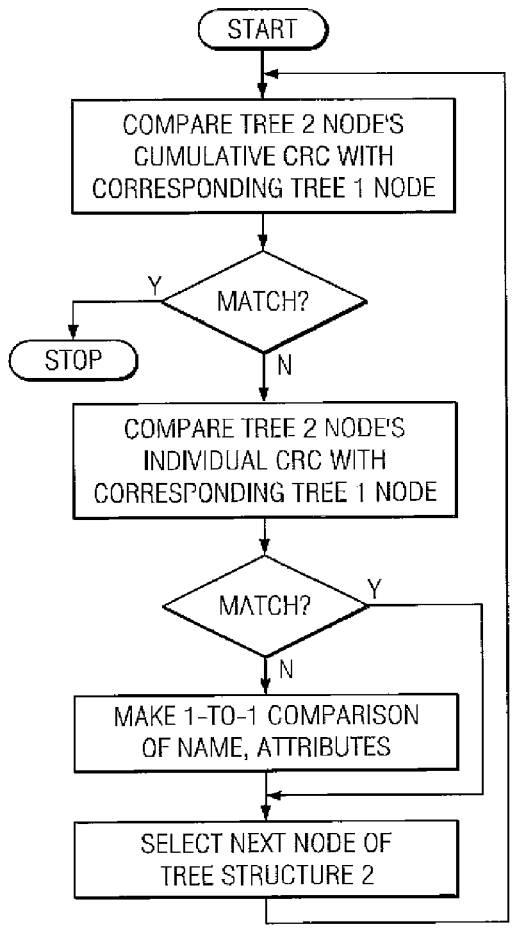
FIG. 5 is a flow diagram illustrating a second approach for the comparison of the individual and cumulative CRCs of two tree structures in one embodiment.

The comparison of the CRCs of the respective tree nodes may proceed in a number of ways. For example, the individual CRCs may be compared before the cumulative CRCs, or the opposite approach may be taken. Two of these approaches are shown in FIGS. 4 and 5. The flow diagrams of these figures correspond generally to step 180 of FIG. 2

Referring to FIG. 4, a flow diagram illustrating a first approach for the comparison of the individual and cumulative CRCs of the two tree structures is shown. In this approach, the individual CRCs are compared first, 181. If the individual CRC's for the selected nodes match, 182, then these nodes are identical. If they do not match, then there is a difference between the nodes. The name and attributes of the nodes are therefore directly compared in order to identify the specific difference between them, 183. In this embodiment, the cumulative CRC is always checked, 184, after the individual CRC. The purpose of checking the cumulative CRC is to determine whether there are any differences in the portion of the tree below the object with which the cumulative CRC is associated. If the cumulative CRCs of the nodes in the two tree structures match, 185, there is no need to proceed further.

(I.e., no need to compare the CRCs of any of the sub-objects.) If, however, the cumulative CRC values for the nodes in both tree structures do not match, it is necessary to select the sub-nodes, 186, and examine them to determine why there is a mismatch. If this is the case, each of the sub-nodes is compared to the corresponding sub-node in the other tree structure in the same manner as described above for the database node.

It should be noted that the specific manner in which the comparison of the CRCs is made may vary from one embodiment to another. For example, rather than comparing individual CRCs first and then comparing the cumulative CRCs, the cumulative CRCs may be compared first. This approach is illustrated in FIG. 5. In this approach, the cumulative CRCs of the selected nodes are compared, 281. If the cumulative CRCs match, 282, then these nodes and all of the sub-nodes below them in the tree structure are determined to be identical. If the cumulative CRCs do not match, then there is a difference in either the selected nodes or their sub-nodes. In order to determine whether the difference lies in the nodes themselves, the individual CRCs of the nodes are compared, 283. If the individual CRCs do not match, 284, then the name and attributes of the nodes are examined to determine the exact difference, 286. If the individual CRCs match, then there must be a difference in the sub-nodes, so they are selected, 285, and examined in the same manner as the previously selected nodes.

It is noted that, if the individual CRCs are compared first, then the efficiency of the method may be improved by having the cumulative CRC cover only the sub-nodes. If the cumulative CRCs are compared first, it is contemplated that the efficiency of the method will be improved by having the cumulative CRC cover the node as well as the sub-nodes (thereby potentially obviating the comparison of the individual CRCs. In fact, in one embodiment, the nodes may have only cumulative CRCs. In this case, if the cumulative CRC of a node did not match, a one-to-one comparison of the node could be made without the necessity of checking an individual CRC.

While the embodiments described above use a 64-bit CRC to represent the names and attributes of the database objects, other embodiments may use other mechanisms for this purpose. For example, an alternative embodiment may use a 32-bit or 128-bit CRC. (The higher the number of bits, the greater the assurance that the CRC represents a unique structure.) Other embodiments may use checksums or hash values in place of the CRCs. For instance, an MD4 or MD5 hashing algorithm could be used to generate hash values based on the names and attributes of the objects. The hash value could be a summarized hash value, or an ordered list of hash values that exist below the associated node. In yet another embodiment, a reversible-CRC could be used. In this case, upon detecting differences in two CRCs, the CRC values could be reversed to determine the basis of the value. All of these different types of values (or any other values of any polynomial or algebraic function that can uniquely, or nearly uniquely, identify a set of data) may be referred to more generically as check values. Thus, the use of CRC values as described herein could be replaced in other embodiments by these other types of check values. It should also be noted that, although less accurate in identifying all differences between objects, it could be possible to calculate the CRCs on the basis of only a portion of the name/attribute information. This could be useful in identifying only specific types of differences.

Another type of variation that may be possible in alternative embodiments is the use of structure information that is not detected directly from the database itself. For example, the structure of a database may be embodied in a series of SQL statements. These statements can therefore be used to generate the tree structure for the database. This may be easier and more convenient than having to pull the information from the database whenever it is needed.

In another possible variation, the tree structure that is generated can also be stored in a memory and later retrieved for comparison to another structure. This may be useful when it is desired to compare a database structure to one or more previous versions of the database. The structure information for each of the previous versions may therefore be archived for later comparison. This may also be useful in the case of a database administrator who needs to compare multiple, remotely-located copies of a database to a master database. In this case, the tree structure for the master database can be generated once and used in many comparisons, possibly at many different locations. There is no need for the database structure information to be retrieved from the master database every time a comparison is made. The present methodology may therefore have less overhead associated with it and may also be more easily scalable than conventional methods.

Another way in which the present methodology can improve the scalability of database comparisons is that it can facilitate the distribution of the comparison workload. Considering the example of the master database and remotely-located copies of the database, the load on the computer maintaining the master database can be tremendous when multiple remote computers attempt to access it to pull information on database objects using conventional methodologies. Using the present methodology, the overhead of pulling the master database information is lower to begin with, and once it is retrieved and the CRCs are generated, it is relatively easy to transmit that data to each of the remote computers so that they can perform the comparisons of the local database structures to the master structure. Also, since the comparison process is shorter and no prior knowledge of differences is required to accurately determine the differences between the database structures, it is easier to distribute responsibility for the comparisons (i.e., it is not necessary to distribute any prior knowledge of differences).

The present methodology may provide a number of benefits relative to conventional methodologies. For example, because all of the information on a database is pulled at once, there is substantially less overhead than is required to pull only portions of the object information at a time, as is typically the case in conventional methods. Thus, load on the database is reduced.

Another advantage is the decreased time required to compare check values. Because numerical comparisons can be made more quickly than string/type comparisons, the comparison of check values proceeds more quickly than the comparison of names and attributes.

Another advantage is the ability to quickly identify differences between databases without having any prior knowledge of the differences. As noted above, using conventional methods, a user can narrow down the scope of a search for differences if he knows where to look for the differences. Without such knowledge, all of the objects in the database must be compared, one-to-one. Using the present methodology, information on all of the objects in the database is pulled at the same time. Because the generated tree structures can be compared very quickly, there is no need to restrict the comparison to certain portions based on prior knowledge of the differences.

Another advantage is the ability to compare entire branches of the tree structures at once using cumulative check values. Because cumulative check values are based on information from each of the objects in the branch, changes in one of the objects will affect the cumulative check value. If the cumulative value matches the corresponding node in the other database's tree, then the entire branch is identical, and there is no need to compare any of the sub-objects in the branch. It may therefore be possible to avoid direct comparisons of large numbers of objects, thereby increasing the speed of the comparison.

It should be noted that the methodologies disclosed herein may be implemented in various combinations of software (including firmware) and hardware. The present application is therefore intended to cover software applications that include instructions for causing a computer or other data processor to perform the methods disclosed herein. These software applications may be embodied in any medium readable by such a computer or data processor, including floppy disks, CD-ROMs, DVD-ROMs, RAM, ROM, and the like. Likewise, a computer or data processor which is configured to execute such software applications, or which is otherwise programmed to perform the methods disclosed herein is intended to be covered by the present application.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms 'comprises,' 'comprising,' or any other variations thereof, are intended to be interpreted as non-exclusively including the elements or limitations which follow those terms. Accordingly, a process, method, article, or apparatus that comprises a list of elements does not include only those elements but may include other elements not expressly listed or inherent to the claimed process, method, article, or apparatus.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A method executable by a processor, comprising:
   retrieving, by a database structure comparison computer, a first database from a first database computer;
   retrieving, by the database structure comparison computer, a second database from a second database computer;
   providing, by the database structure comparison computer, a first tree structure representative of the structure of the first database and a second tree structure representative of the structure of the second database, wherein the tree structures include nodes representative of database objects in the respective databases;
   generating, by the database structure comparison computer, an individual cyclic redundancy check (CRC) value and a cumulative CRC value for each node in the first tree structure and each node in the second tree structure;
   comparing, from top to bottom, by the database structure comparison computer, the individual CRC value and the cumulative CRC value associated with a parent node in the first tree structure with the individual CRC value and the cumulative CRC value associated with a corresponding parent node in the second tree structure wherein comparing the individual CRC values and the cumulative CRC values comprises: beginning with a parent node in each tree structure, comparing the individual CRC values of the parent node and, if the individual CRC values do not match, comparing the characteristics of the parent node and comparing the cumulative CRC values and, if the cumulative CRC values match, not comparing the cumulative or individual CRC values of the parent nodes' sub-nodes, and if the cumulative CRC values do not match, comparing the cumulative CRC values of the parent nodes' sub-nodes;

identifying, by the database structure comparison computer, differences between the first database and the second database based on the comparison of the individual and cumulative CRC values, wherein if the cumulative CRC value for a parent node in the first tree structure matches the cumulative CRC value for a corresponding parent node in the second tree structure, child nodes of the matching parent nodes are not compared, wherein if the individual CRC value for a parent node in the first tree structure matches the individual CRC value for a parent node in the second tree structure, the cumulative CRC value for that parent node in the first tree structure is not compared with the cumulative CRC value for the parent node in the second tree structure; and sending, to a database administrator computer, information related to the database comparison.

2. The method of claim 1, wherein providing at least one of the tree structures comprises retrieving at least one tree structure from a memory.

3. The method of claim 1, wherein generating a cumulative check value for the parent node comprises calculating a cumulative CRC value for the parent node on the basis of database objects corresponding to the sub-nodes below the parent node and associating the cumulative CRC value with the parent node.

4. The method of claim 3, wherein generating a cumulative CRC value for the parent node comprises calculating a cumulative CRC value for the parent node on the basis of database objects corresponding to the parent node and sub-nodes below the parent node and associating the cumulative CRC value with the parent node.

5. The method of claim 1, wherein generating an individual CRC value for a the parent node comprises calculating an individual CRC value for each node on the basis of the database object corresponding to the node and associating the individual CRC value with the node.

6. The method of claim 5, wherein comparing the individual CRC values and the cumulative CRC values comprises:

beginning with the parent node in each tree structure, comparing the cumulative CRC values of the parent nodes and, if the cumulative CRC values match, not comparing the CRC values of the parent nodes' sub-nodes, and if the cumulative CRC values do not match, comparing the CRC values of the parent nodes' sub-nodes.

7. The method of claim 6, further comprising, if the cumulative CRC values of the parent nodes do not match, comparing the individual CRC-values of the parent nodes and, if the individual CRC values do not match, comparing the attributes of the parent nodes.

8. The method of claim 5, wherein the individual CRC-value for the selected node is calculated based on a name and attributes of the database object corresponding to the selected node.

9. A software program product embodied in a computer readable storage medium readable by a data processor, wherein the software program product comprises one or more instructions configured to cause a data processor to perform the method comprising:

retrieving, by a database structure comparison computer, a first database from a first database computer;

retrieving, by the database structure comparison computer, a second database from a second database computer;

providing, by the database structure comparison computer, a first tree structure representative of the structure of the first database and a second tree structure representative of the structure of the second database, wherein the tree structures include nodes representative of database objects in the respective databases;

generating, by the database structure comparison computer, an individual cyclic redundancy check (CRC) value and a cumulative CRC value for each node in the first tree structure and each node in the second tree structure;

comparing, from top to bottom, by the database structure comparison computer, the individual CRC value and the cumulative CRC value associated with a parent node in the first tree structure with the individual CRC value and the cumulative CRC value associated with a corresponding parent node in the second tree structure wherein comparing the cumulative CRC value and the individual CRC value for a node comprises: beginning with a parent node in each tree structure, comparing the individual CRC values of the parent node and, if the individual CRC values do not match, comparing the characteristics of the parent node and comparing the cumulative CRC values and, if the cumulative CRC values match, not comparing the cumulative or individual CRC values of the parent nodes' sub-nodes, and if the cumulative CRC values do not match, comparing the cumulative CRC values of the parent nodes' sub-nodes;

identifying, by the database structure comparison computer, differences between the first database and the second database based on the comparison of the individual and cumulative CRC values, wherein if the cumulative CRC value for a parent node in the first tree structure matches the cumulative CRC value for a corresponding parent node in the second tree structure, child nodes of the matching parent nodes are not compared, wherein if the individual CRC value for a parent node in the first tree structure matches the individual CRC value for a parent node in the second tree structure, the cumulative CRC value for that parent node in the first tree structure is not compared with the cumulative CRC value for the parent node in the second tree structure; and sending, to a database administrator computer, information related to the database comparison.

10. The software program product of claim 9, wherein providing at least one of the tree structures comprises retrieving at least one tree structure from a memory.

11. The software program product of claim 9, wherein a cumulative CRC value comprises a CRC value is calculated for the parent node on the basis of database objects corresponding to the sub-nodes below the parent node and associated with the parent node.

12. The software program product of claim 9, wherein the generated cumulative CRC value for each parent node comprises a cumulative CRC value calculated on the basis of database objects corresponding to the parent node and sub-nodes below the parent node.

13. The software program product of claim 12, wherein the individual CRC value is calculated on the basis of the database object corresponding to the node.

14. The software program product of claim 13, wherein comparing the one or more CRC values comprises:
   beginning with a parent node in each tree structure, comparing the cumulative CRC values of the parent nodes and, if the cumulative CRC values match, not comparing the CRC values of the parent nodes' sub-nodes, and if the cumulative CRC values do not match, comparing the CRC values of the parent nodes' sub-nodes.

15. The software program product of claim 14, wherein the method further comprises further comprising, if the cumulative CRC values of the parent nodes do not match, comparing the individual CRC values of the parent nodes and, if the individual CRC values do not match, comparing the attributes of the parent nodes.

16. The software program product of claim 9, wherein the individual CRC value for a selected node is calculated on the basis of the database object corresponding to the selected node.

17. The software program product of claim 16, wherein the individual CRC value for the selected node is calculated based on a name and attributes of the database object corresponding to the selected node.

18. A method executable by a processor, comprising:
   retrieving, by a database structure comparison computer, a first database from a first database computer;
   retrieving, by the database structure comparison computer, a second database from a second database computer;
   analyzing the first database to create a first tree structure representative of the structure of the first database using structure data associated with the first database, wherein the first tree structure includes a set of first nodes each first node representing a corresponding database object of the first database;
   analyzing the second database to create a second tree structure representative of the structure of the first database using structure data associated with the second database wherein the second tree structure includes a set of second nodes each second node representing a corresponding database object of the second database;
   calculating an individual CRC value and a cumulative CRC value for each first node based on the database object corresponding to the first node and for each second node based on the database object corresponding to the second node;
   comparing, from top to bottom, the individual CRC value and the cumulative CRC values associated with first nodes in the first tree structure with the individual CRC value and the cumulative CRC values associated with second nodes in the second tree structure wherein comparing the cumulative CRC value and the individual CRC value for a node comprises: beginning with a parent node in each tree structure, comparing the individual CRC values of the parent node and, if the individual CRC values do not match, comparing the characteristics of the parent node and comparing the cumulative CRC values and, if the cumulative CRC values match, not comparing the cumulative or individual CRC values of the parent nodes' sub-nodes, and if the cumulative CRC values do not match, comparing the cumulative CRC values of the parent nodes' sub-nodes;
   identifying differences between the first database and the second database based on the comparison of the individual and cumulative CRC values, wherein if the cumulative CRC value for a parent node in the first tree structure matches the cumulative CRC value for a corresponding parent node in the second tree structure, child nodes of the matching parent nodes are not compared and wherein if the individual CRC value for a parent node in the first tree structure matches the individual CRC value for a parent node in the second tree structure, the cumulative CRC value for that parent node in the first tree structure is not compared with the cumulative CRC value for the parent node in the second tree structure; and
   sending, to a database administrator computer, information related to the database comparison.

* * * * *